(12) United States Patent
Nomura et al.

(10) Patent No.: US 11,364,989 B2
(45) Date of Patent: Jun. 21, 2022

(54) WING AND WING DESIGN METHOD

(71) Applicant: MITSUBISHI HEAVY INDUSTRIES, LTD., Tokyo (JP)

(72) Inventors: Takayuki Nomura, Tokyo (JP); Satoshi Kodama, Tokyo (JP); Takaaki Yumitori, Tokyo (JP); Kiyoka Takagi, Tokyo (JP); Tooru Shitani, Tokyo (JP); Toshio Abe, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 64 days.

(21) Appl. No.: 16/753,172

(22) PCT Filed: Sep. 10, 2018

(86) PCT No.: PCT/JP2018/033418
§ 371 (c)(1),
(2) Date: Apr. 2, 2020

(87) PCT Pub. No.: WO2019/073730
PCT Pub. Date: Apr. 18, 2019

(65) Prior Publication Data
US 2020/0298955 A1     Sep. 24, 2020

(30) Foreign Application Priority Data

Oct. 10, 2017   (JP) .............................. JP2017-196548

(51) Int. Cl.
*B64C 3/26* (2006.01)
(52) U.S. Cl.
CPC ..................................... *B64C 3/26* (2013.01)

(58) Field of Classification Search
None
See application file for complete search history.

(56) References Cited

U.S. PATENT DOCUMENTS

| | | |
|---|---|---|
| 2005/0163975 A1 | 7/2005 | Chen et al. |
| 2010/0121625 A1 | 5/2010 | Krog |
| 2016/0283648 A1 | 9/2016 | Akiba |
| 2017/0057195 A1 | 3/2017 | Blom et al. |

FOREIGN PATENT DOCUMENTS

| | | |
|---|---|---|
| JP | 58-81896 | 5/1983 |
| JP | 2016-184223 | 10/2016 |

OTHER PUBLICATIONS

Written Opinion dated Nov. 27, 2018 in corresponding International (PCT) Application No. PCT/JP2018/033418; with English Translation.
International Search Report dated Nov. 27, 2018 in corresponding International (PCT) Application No. PCT/JP2018/033418.

*Primary Examiner* — Alexander S Thomas
(74) *Attorney, Agent, or Firm* — Wenderoth, Lind & Ponack, L.L.P.

(57) ABSTRACT

A wing used for an aircraft includes a configuration member formed of a composite material. The configuration member is divided into a plurality of regions along a surface thereof. The plurality of regions include a first region formed of the composite material of a high strength type, and a second region formed of the composite material of a high elasticity type having higher rigidity than the high strength type. The first region includes any region closest to a wing end side out of the plurality of regions, and the second region includes a region closest to the wing end side and a trailing edge side out of the plurality of regions.

6 Claims, 7 Drawing Sheets

FIG. 3
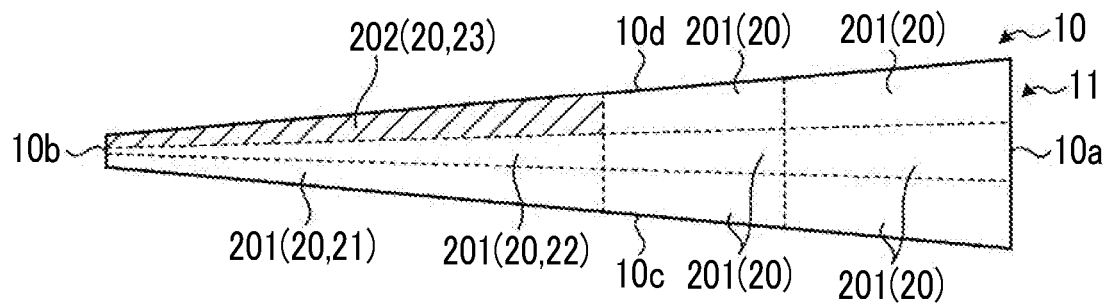
FIG. 4
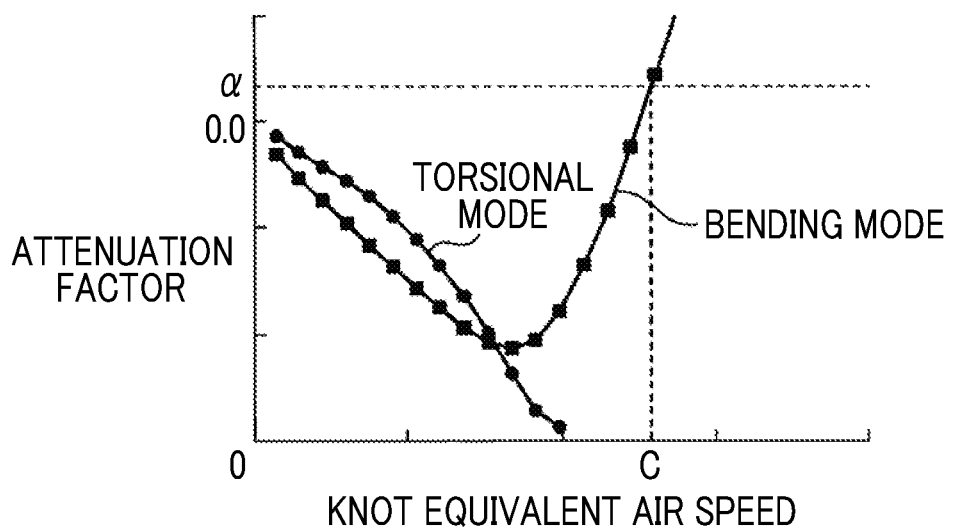
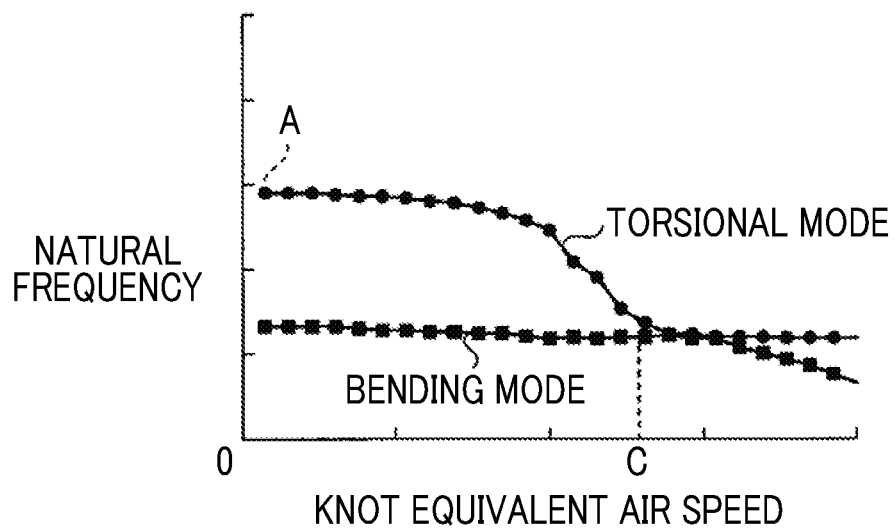

FIG. 5
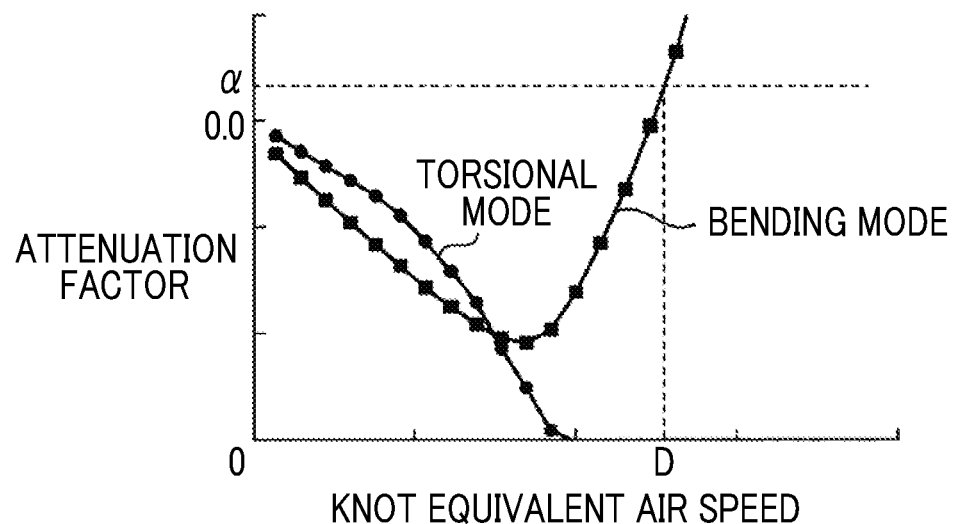
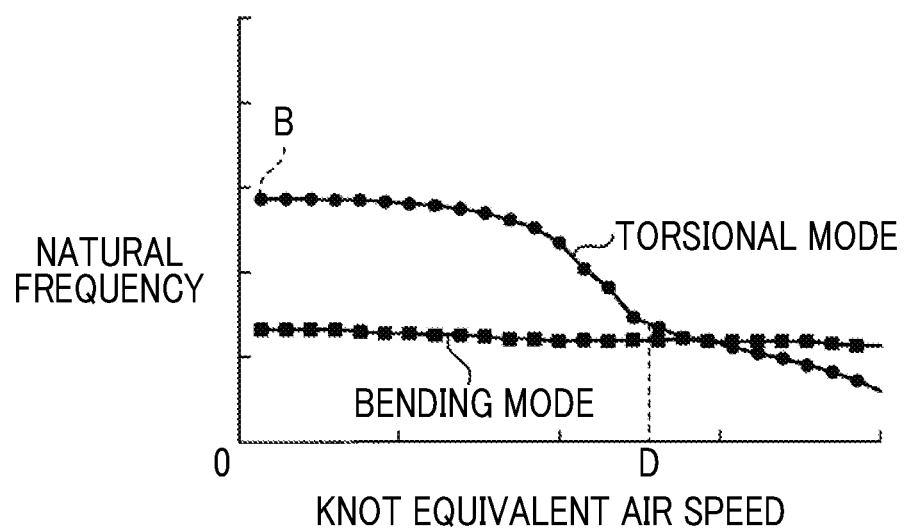
FIG. 6
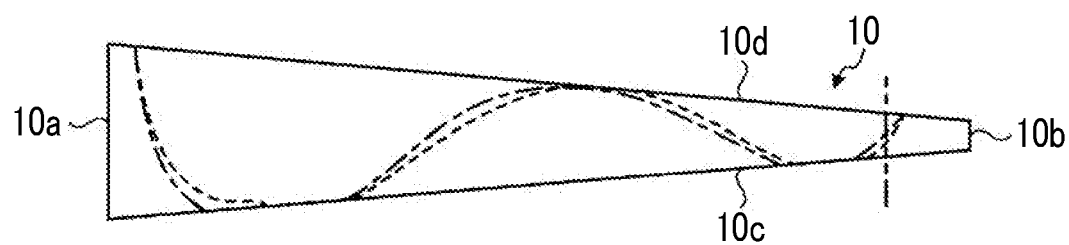

WING AND WING DESIGN METHOD

TECHNICAL FIELD

The present invention relates to a wing and a design method of a wing.

BACKGROUND ART

In the related art, a technology relating to a wing whose configuration member is formed of a composite material is known. For example, Japanese Unexamined Patent Application Publication No. 58-81896 discloses a technology as follows. With regard to a skin of the wing used for an aircraft, a wing root side is formed of the composite material of a high strength type, and a wing end side is formed of the composite material of a high elasticity type.

CITATION LIST

In the wing disclosed in Japanese Unexamined Patent Application Publication No. 58-81896, the composite material of the high elasticity type having higher rigidity than the composite material of the high strength type is used on the wing end side. In this manner, the rigidity is strengthened on the wing end side of the wing, and flutter characteristics are improved without increasing a thickness of the wing (weight of the wing).

However, the composite material of the high elasticity type is generally more expensive than the composite material of the high strength type. Accordingly, a range for using the composite material of the high elasticity type is preferably as small as possible. Therefore, from a viewpoint of compatibly achieving improved flutter characteristics and reduced manufacturing cost of the wing, there is still room for improvement in a structure of the wing formed of the composite material.

The present invention is made in view of the above-described circumstances, and an object thereof is to compatibly achieve improved flutter characteristics and reduced manufacturing cost of a wing which is used for an aircraft and which includes a configuration member formed of a composite material.

SUMMARY OF THE INVENTION

According to the present invention, in order to solve the above-described problem and to achieve the object, there is provided a wing used for an aircraft. The wing includes a configuration member formed of a composite material. The configuration member is divided into a plurality of regions along a surface thereof. The plurality of regions include a first region formed of the composite material of a high strength type, and a second region formed of the composite material of a high elasticity type having higher rigidity than the high strength type. The first region includes any region closest to a wing end side out of the plurality of regions, and the second region includes a region closest to the wing end side and a trailing edge side out of the plurality of regions.

According to this configuration, the region closest to the wing end side and the trailing edge where flutter characteristics of the wing are greatly affected by the rigidity of the configuration member are formed of the composite material of the high elasticity type. Therefore, while the flutter characteristics of the wing are improved, the composite material of the high elasticity type can be prevented from being used in an unnecessary range. In addition, any region closest to the wing end side of the configuration member is formed of the composite material of the high strength type. Therefore, a range for using the composite material of the high elasticity type can be reduced, compared to a case where all of the regions closest to the wing end side are formed of the composite material of the high elasticity. Therefore, according to the present invention, it is possible to compatibly achieve improved flutter characteristics and reduced manufacturing cost of the wing used for the aircraft and including the configuration member formed of the composite material.

In addition, a surface of the configuration member may be a wing upper surface. It is preferable that the plurality of regions are divided in a wing length direction and a wing chord direction orthogonal to the wing length direction.

According to this configuration, the plurality of regions are divided in the wing length direction and the wing chord direction. Therefore, a configuration can be easily adopted in which the first region includes any region closest to the wing end side out of the plurality of regions, and in which the second region includes the region closest to the wing end side and the trailing edge side out of the plurality of regions.

In addition, it is preferable that the plurality of regions are divided in a grid shape in the wing length direction and the wing chord direction.

According to this configuration, even if the configuration member is formed using different types of the composite material for each region, the configuration member can be easily manufactured, compared to a case where each region has a complicated shape or arrangement.

In addition, it is preferable that the plurality of regions are divided to have an equal area.

According to this configuration, even if the configuration member is formed using different types of the composite material for each region, the configuration member can be easily manufactured, compared to a case where each region has a different size.

In addition, it is preferable that the configuration member is a skin.

According to this configuration, with regard to the skin by which the flutter characteristics of the wing are greatly affected, and which is a relatively large configuration member, it is possible to more suitably determine whether the composite material of the high strength type or the composite material of the high elasticity type is used for each region. Therefore, it is possible to more satisfactorily achieve the improved flutter characteristics and the reduced manufacturing cost.

According to the present invention, in order to solve the above-described problem and to achieve the object, there is provided a design method of a wing used for an aircraft and including a configuration member formed of a composite material. The design method includes a region setting step of dividing a surface of the configuration member into a plurality of regions, a pattern setting step of setting each pattern of a first region and a second region by dividing the plurality of regions into the first region formed of the composite material of a high strength type and the second region formed of the composite material of a high elasticity type having higher rigidity than the high strength type, a flutter speed calculation step of calculating a flutter speed at which a flutter occurs in the wing, for each pattern by using a numerical analysis, and an optimal pattern determination step of determining the pattern that maximizes the calculated flutter speed, as an optimal pattern.

According to this configuration, the pattern that maximizes the flutter speed at which the flutter occurs in the wing can be calculated for the patterns of the first region formed of the composite material of the high strength type and the second region formed of the composite material of the high elasticity type. Therefore, while the flutter characteristics of the wing are improved, the composite material of the high elasticity type can be prevented from being used in an unnecessary range. Therefore, according to the present invention, it is possible to compatibly achieve the improved flutter characteristics and the reduced manufacturing cost of the wing used for the aircraft and including the configuration member formed of the composite material.

BRIEF DESCRIPTION OF DRAWINGS

FIG. 3 is a plan view schematically illustrating an upper skin.

FIG. 4 is a view for describing flutter characteristics of the wing according to the present embodiment.

FIG. 5 is a view for describing the flutter characteristics of the wing serving as a first comparative example.

FIG. 6 is a view for describing a nodal line analysis result of torsional mode vibration in the wing according to the embodiment and a wing according to a second comparative example.

DESCRIPTION OF EMBODIMENTS

Hereinafter, an embodiment of a wing and a design method of a wing according to the present invention will be described in detail with reference to the drawings. The present invention is not limited to the embodiment.

Figure 1:
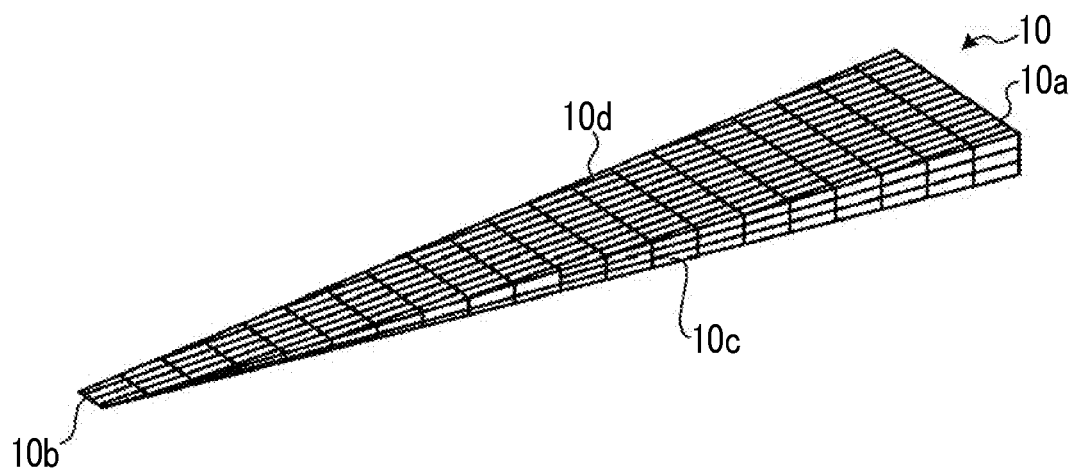
FIG. 1 is a perspective view schematically illustrating a wing according to an embodiment.
Figure 2:
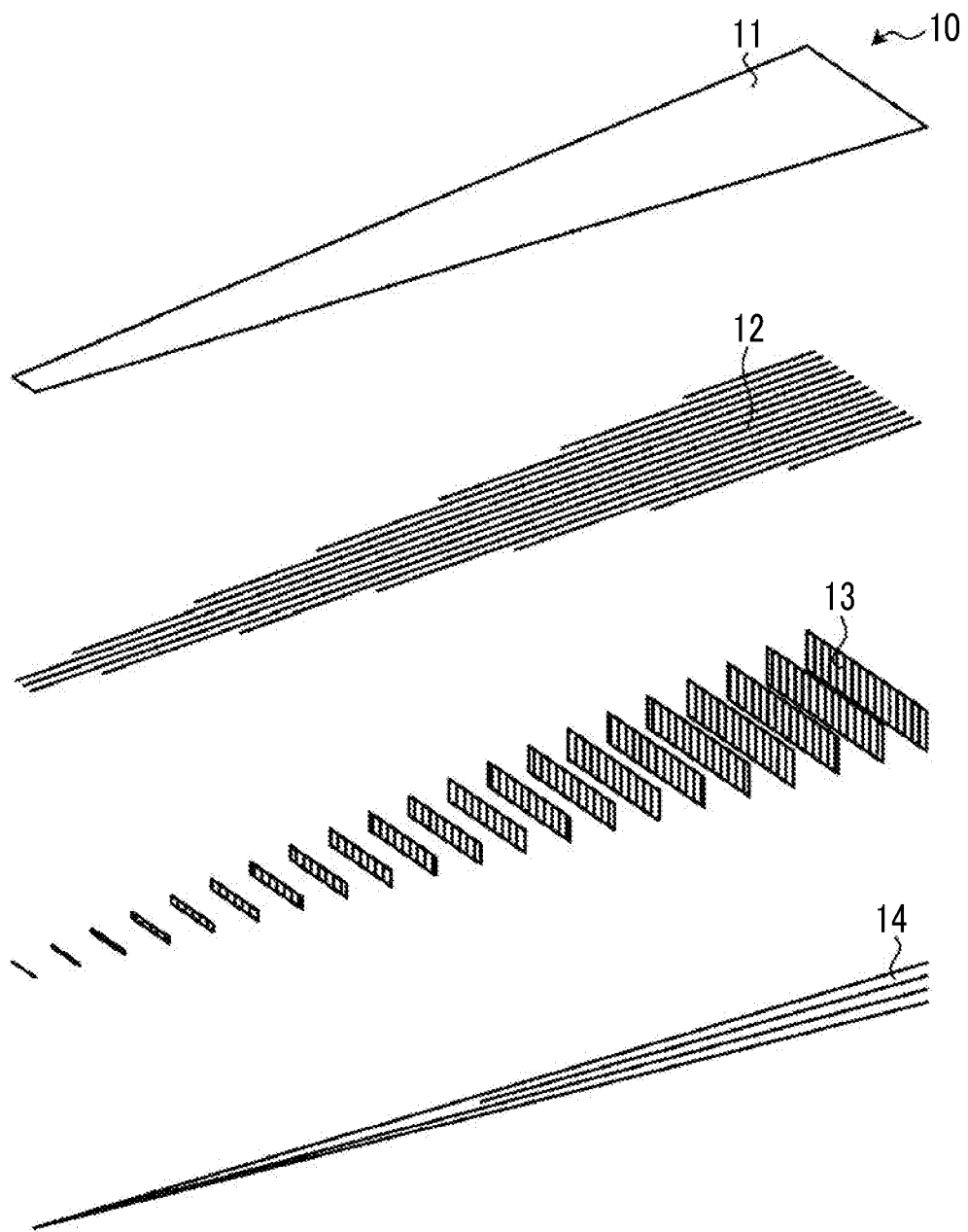
FIG. 2 is an exploded perspective view schematically illustrating the wing according to the embodiment.

FIG. 1 is a perspective view schematically illustrating the wing according to the embodiment. FIG. 2 is an exploded perspective view schematically illustrating the wing according to the embodiment. As illustrated, a wing 10 includes an upper skin 11, a stringer 12, a rib 13, a girder 14, and a lower skin (not illustrated), as configuration members. The respective configuration members of the wing 10 are formed by stacking a plurality of composite materials on each other.

The upper skin 11 is a skin above the wing 10. A lower skin (not illustrated) is a skin below the wing 10, and is located to face the upper skin 11. A plurality of the stringers 12 are disposed inside the upper skin 11 and the lower skin, and are longitudinal members located along a wing length direction from a wing root 10a to a wing end 10b of the wing 10. The ribs 13 are frame members aligned with each other at a predetermined interval in the wing length direction of the wing 10. The girder 14 is disposed between the upper skin 11 and the lower skin. The girders 14 are located in the wing length direction of the wing 10, and are located one by one on a leading edge 10c side and a trailing edge 10d side of the wing 10.

FIG. 3 is a plan view schematically illustrating the upper skin. As illustrated in a range separated by a broken line in FIG. 3, the upper skin 11 is divided into a plurality of (nine in the present embodiment) regions 20 along a surface, that is, along a wing upper surface. In the present embodiment, the plurality of regions 20 are divided in a grid shape in the wing length direction and a wing chord direction (upward-downward direction in FIG. 3) orthogonal to the wing length direction. In the present embodiment, the plurality of regions 20 are divided to have an equal area of the upper skin 11.

The plurality of regions 20 are configured to include a plurality of first regions 201 and a second region 202. Each first region 201 is formed of a first composite material of a high strength type. The second region 202 is formed of a second composite material of a high elasticity type having higher rigidity than the composite material of the high strength type used for each of the first region 201. The first region 201 represents all of the regions except the second region 202 out of the plurality of regions 20. The first region 201 includes regions 21 and 22 closest to the wing end 10b side out of the plurality of regions 20. As illustrated in a hatched range in FIG. 3, the second region 202 is a region 23 closet to the wing end 10b side and a trailing edge 10d side out of the plurality of regions 20.

Here, while an aircraft flies, self-excited vibration, a so-called flutter may occur in the wing 10 due to an increased flying speed of the aircraft. The flutter occurs in a combination between torsional mode vibration generated in the wing 10 and bending mode vibration. The present inventors analyzed flutter characteristics of the wing 10 by using a numerical analysis method such as a finite element method, for example. Hereinafter, the flutter characteristics of the wing 10 according to the embodiment will be described compared to flutter characteristics of a wing serving as a comparative example.

FIG. 4 is a view for describing the flutter characteristics of the wing according to the present embodiment. FIG. 5 is a view for describing the flutter characteristics of the wing serving as a first comparative example. In the wing serving as the first comparative example, the plurality of regions 20 illustrated in FIG. 3 are all formed of the composite material of the high strength type. An upper drawing in FIG. 4 is a view for describing analysis results of a relationship between airspeed in the wing 10, and a torsional mode vibration attenuation factor and a bending mode vibration attenuation factor. A lower drawing in FIG. 4 is a view for describing analysis results of a relationship between the airspeed in the wing 10, and a torsional mode natural frequency and a bending mode natural frequency. In addition, an upper drawing in FIG. 5 is a view for describing analysis results of a relationship between airspeed in the wing serving as the first comparative example, and the torsional mode vibration attenuation factor and the bending mode vibration attenuation factor. A lower drawing in FIG. 5 is a view for describing analysis results of a relationship between the airspeed in the wing serving as the first comparative example, and the torsional mode natural frequency and the bending mode natural frequency. In FIGS. 4 and 5, knot equivalent air speed (KEAS) is applied to the air speed. The airspeed does not need to be expressed by a knot. Accordingly, without being limited to the knot equivalent airspeed, the airspeed may be a relative speed between the aircraft and air. Therefore, the airspeed may simply be an equivalent airspeed. In FIGS. 4 and 5, the attenuation factor means a vibration attenuation factor, and is a value obtained by adopting a natural logarithm of a ratio between adjacent amplitudes in vibration waveforms. In view of an effect of structural attenuation caused by the wing itself, the attenuation factor is obtained on the assumption that the flutter occurs in the wing when the attenuation factor reaches a threshold α which is slightly greater than a value 0.

As illustrated in the lower drawing in FIG. 4, the torsional mode natural frequency in the wing 10 is a value A when the airspeed is set to the value 0. In contrast, as illustrated in the lower drawing in FIG. 5, the torsional mode natural frequency in the wing according to the first comparative example is a value B smaller than the value A. The reason is as follows. The second region 202 of the wing 10 is formed of the composite material of the high elasticity type. Accordingly, the rigidity of the wing 10 increases, and a torsional movement is prevented compared to the wing serving as the first comparative example. On the other hand, in the bending mode, the leading edge 10c side and the trailing edge 10d side of the wing 10 in FIG. 3 deform in substantially the same manner. Accordingly, if only the region 202 is formed of the composite material of the high elasticity type, the rigidity of only one side between the leading edge 10c side and the trailing edge 10d side increases. Therefore, the natural frequency in the bending mode increases less than the natural frequency in the torsional mode. That is, the second region 202 is formed of the composite material of the high elasticity type. In this manner, the natural frequency in the torsional mode can increase more than the natural frequency in the bending mode. Accordingly, in a case where the airspeed is the value 0 in the wing 10 in FIG. 4, a difference (frequency difference) between the torsional mode natural frequency and the bending mode natural frequency increases more than that in the wing serving as the first comparative example. In addition, in FIGS. 4 and 5, if the airspeed increases, the torsional mode natural frequency decreases. On the other hand, the bending mode natural frequency is substantially the same as the natural frequency in a case where the airspeed is 0, and is substantially constant. Therefore, the torsional mode natural frequency and the bending mode natural frequency are the same frequency at a predetermined airspeed. The torsional mode vibration and the bending mode vibration start in combination with each other. That is, the airspeed at which the torsional mode natural frequency and the bending mode natural frequency are close to each other is the airspeed which causes the combined vibration. In this case, the frequency difference in the wing 10 in FIG. 4 increases more than that according to the first comparative example when the airspeed is the value 0. Therefore, in a case where the torsional mode changes in FIGS. 4 and 5 are substantially the same as each other, an intersection point in FIG. 4 is shifted as much as the increased frequency difference to a side where the airspeed is faster than the airspeed in an intersection point in FIG. 5. As a result, as illustrated in the upper drawings in FIGS. 4 and 5, in the wing serving as the first comparative example, when the airspeed reaches a value D, the attenuation factor exceeds a threshold α. On the other hand, in the wing 10 according to the embodiment, when the airspeed reaches a value C greater than the value D, the attenuation factor exceeds the threshold α. In this way, compared to the wing according to the first comparative example, the wing 10 according to the embodiment has the airspeed at which the attenuation factor exceeds the threshold α. That is, a value of the flutter speed increases, and it is possible to prevent the flutter occurrence.

Figure 7:
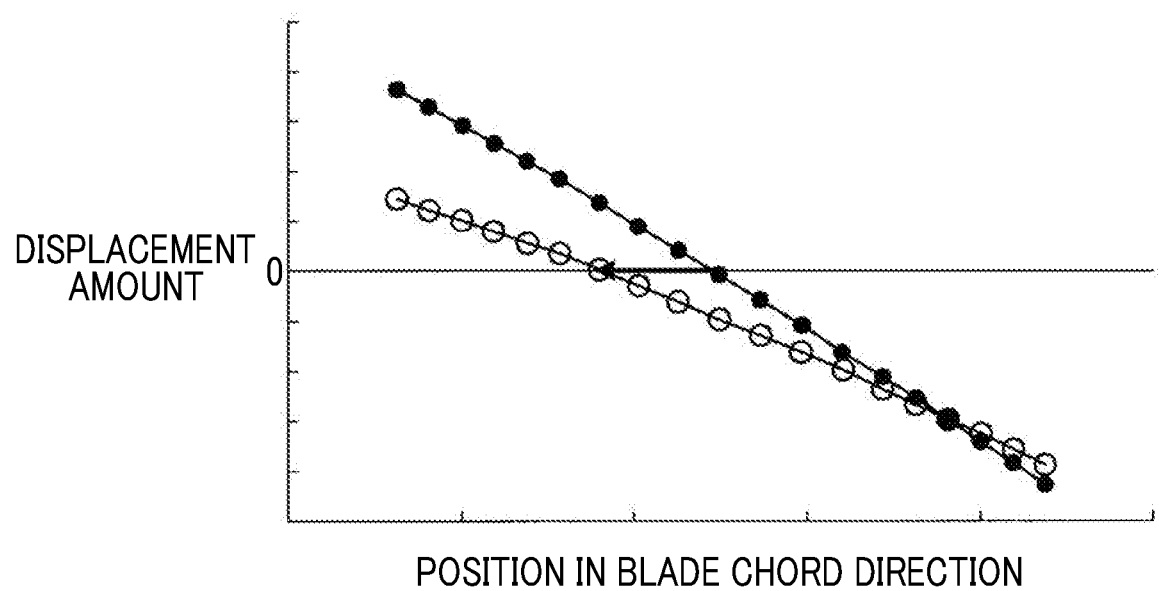
FIG. 7 is a view for describing each result obtained by analyzing the wing according to the embodiment and the wing according to a second comparative example, with regard to a torsional mode vibration displacement amount at a cross-sectional position in a wing chord direction indicated by a two-dot chain line in FIG. 6.

In addition, depending on a position of the second region 202 formed of the composite material of the high elasticity type, a nodal line that connects nodes (joints) of the torsional mode vibration is changed. FIG. 6 is a view for describing a nodal line analysis result of the torsional mode vibration in the wing according to the embodiment and a wing according to a second comparative example. A broken line in FIG. 6 indicates the nodal line in the wing 10 according to the embodiment, and a two-dot chain line in FIG. 6 indicates a cross-sectional position of the wing 10 when indicating a node position in a wing 100 (refer to FIG. 8) serving as the second comparative example. The wing serving as the second comparative example is configured as follows. Only the region 21 (refer to FIG. 3) closest to the wing end 10b side and the leading edge 10c side is set as the second region 202 formed of the composite material of the high elasticity type. The remaining regions 20 are all set as the first region 201 formed of the composite material of the high strength type. In addition, FIG. 7 is a view for describing each result obtained by analyzing the wing 10 according to the embodiment and the wing according to the second comparative example, with regard to a torsional mode vibration displacement amount at a cross-sectional position in the wing chord direction indicated by a two-dot chain line in FIG. 6. In FIG. 7, a line that connects black circles indicates a displacement amount of the wing 100 serving as the second comparative example, and a line that connects white circles indicates a displacement amount of the wing 10 according to the embodiment. In FIG. 7, a position where the displacement amount is the value 0 is the node of the torsional mode vibration.

Figure 8:
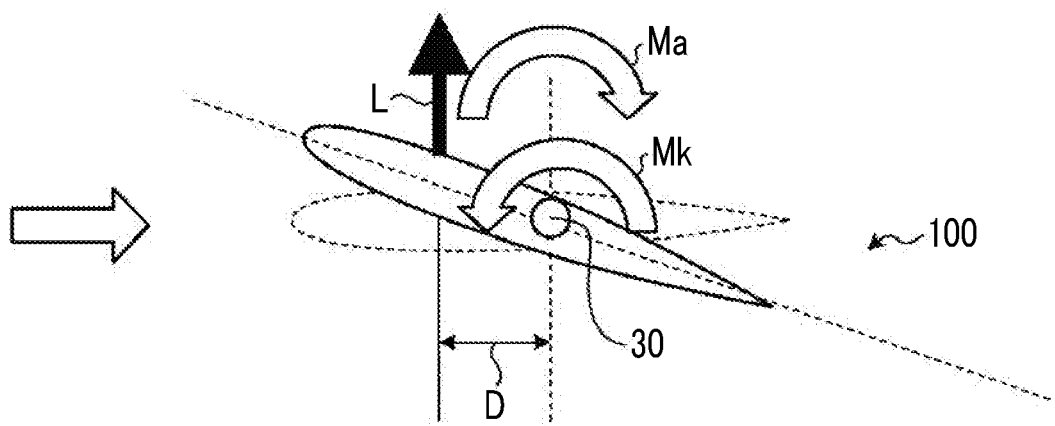
FIG. 8 is a view schematically illustrating a relationship of moments acting on the wing around a node in a torsional mode in the wing serving as the second comparative example.
Figure 9:
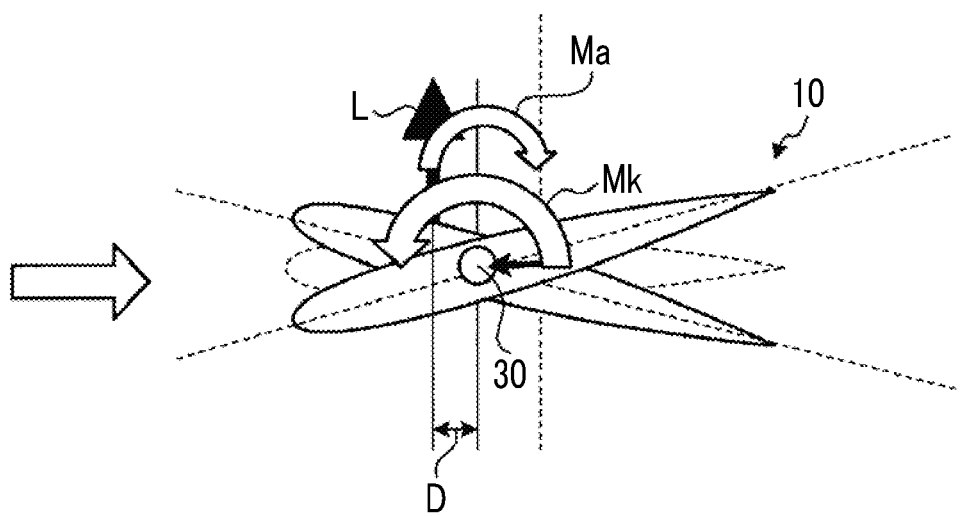
FIG. 9 is a view schematically illustrating a relationship of moments acting on the wing around the node in the torsional mode in the wing according to the embodiment.

As illustrated in FIGS. 6 and 7, in the wing 10 according to the embodiment, the nodal line in the vicinity of the wing end 10b moves to the leading edge 10c side, compared to the wing serving as the second comparative example. The reason is as follows. The trailing edge 10d side is formed of the composite material of the high elasticity type. In this manner, the trailing edge 10d side has higher rigidity than the leading edge 10c side, thereby preventing the deformation on the trailing edge 10d side. Here, FIG. 8 is a view schematically illustrating a relationship of moments acting on the wing around the node in the torsional mode in the wing serving as the second comparative example. FIG. 9 is a view schematically illustrating a relationship of moments acting on the wing around the node in the torsional mode in the wing according to the embodiment. As illustrated, it is assumed that a lifting force L acts on the wing 10 and the wing 100. In this case, as indicated by a solid-line arrow in a clockwise direction in the drawing, a moment force Ma that is a product of the distance D from an action point of the lifting force L to a node 30 in the torsional mode and the lifting force L acts on the wing 10 and the wing 100. In addition, as indicated by a solid-line arrow in a counter-clockwise direction in the drawing, a moment force Mk generated by its own elastic restoring force acts on the wing 10 and the wing 100. As described above, in the wing 10 according to the embodiment, the node 30 is located on the leading edge 10c side, compared to the wing 100. Accordingly, the distance D decreases, and the moment force Ma decreases. As a result, compared to the wing 100, the number of torsional mode vibrations in the wing 10 is prevented from being changed. Accordingly, the flutter speed increases, and the flutter occurrence is prevented.

As described above, according to the wing 10 in the embodiment, the region 20 closest to the wing end 10b side and the trailing edge 10d side where the flutter characteristics of the wing 10 is greatly affected by the rigidity of the upper skin 11 is formed of the composite material of the high elasticity type. Therefore, while the flutter characteristics of the wing 10 are improved, the composite material of the high elasticity type can be prevented from being used in an unnecessary range. In addition, any region 20 closest to the wing end 10b side of the upper skin 11 is formed of the composite material of the high strength type. Therefore, a range for using the composite material of the high elasticity type can be reduced, compared to a case where all of the regions closest to the wing end 10b side are formed of the composite material of the high elasticity. Therefore, according to the wing 10 in the embodiment, it is possible to compatibly achieve the improved flutter characteristics and the reduced manufacturing cost of the wing 10 used for the aircraft and including the configuration member formed of the composite material.

In the present embodiment, the surface of the configuration member is the wing upper surface, and the plurality of regions 20 are divided in the wing length direction and the wing chord direction orthogonal to the wing length direction.

According to this configuration, the plurality of regions 20 are divided in the wing length direction and the wing chord direction. Therefore, a configuration can be easily adopted in which the first region 201 includes any regions 21 and 22 closest to the wing end 10b side and closest to the leading edge 10c out of the plurality of regions 20, and in which the second region 202 includes the region 23 closest to the wing end 10b side and the trailing edge 10d side out of the plurality of regions 20.

The plurality of regions 20 is divided in a grid shape in the wing length direction and the wing chord direction.

According to this configuration, even if the configuration member is formed using different types of the composite material for each region 20, the configuration member can be easily manufactured, compared to a case where each region 20 has a complicated shape or arrangement.

In addition, the plurality of regions 20 are divided to have an equal area.

According to this configuration, even if the configuration member is formed using different types of the composite material for each region 20, the configuration member can be easily manufactured, compared to a case where each region 20 has a different size.

In addition, the configuration member is the upper skin 11.

According to this configuration, with regard to the upper skin 11 by which the flutter characteristics of the wing 10 are greatly affected, and which is a relatively large configuration member, it is possible to more suitably determine whether the composite material of the high strength type or the composite material of the high elasticity type is used for each region. Therefore, it is possible to more satisfactorily achieve the improved flutter characteristics and the reduced manufacturing cost.

Figure 10:
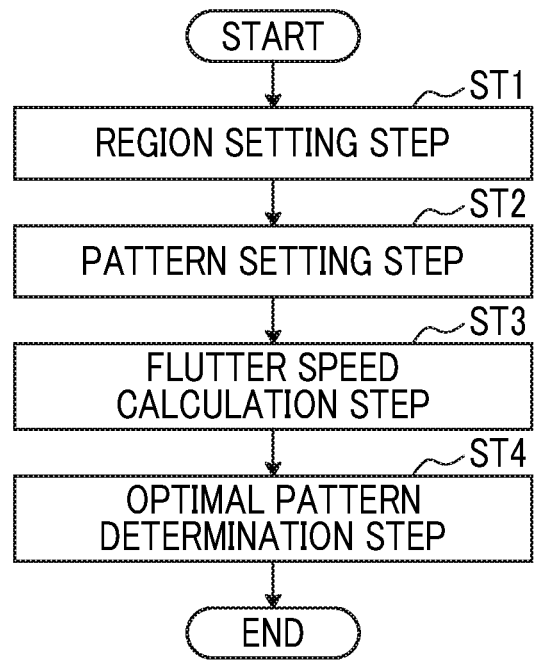
FIG. 10 is a flowchart illustrating a procedure of a design method of the wing according to the embodiment.

Next, a design method of the wing according to the embodiment will be described. FIG. 10 is a flowchart illustrating a procedure of the design method of the wing according to the embodiment. The design method of the wing according to the embodiment includes a region setting step ST1, a pattern setting step ST2, a flutter speed calculation step ST3, and an optimal pattern determination step ST4.

The region setting step ST1 is a step of setting the plurality of regions 20 obtained by dividing the upper skin 11 in the wing length direction and the wing chord direction. In the present embodiment, as illustrated in FIG. 3, the grid shape and the surface area are equally divided into nine regions 20 in the wing length direction and the wing chord direction.

The pattern setting step ST2 is a step of setting each pattern of the first region 201 and the second region 202 by dividing the plurality of regions 20 into the first region 201 formed of the composite material of the high strength type and the second region 202 formed of the composite material of the high elasticity type having higher rigidity than the high strength type. In the present embodiment, nine patterns are prepared by setting any one of the plurality of regions 20 as the second region 202 and setting all of the remaining regions as the first region 201.

Figure 11:
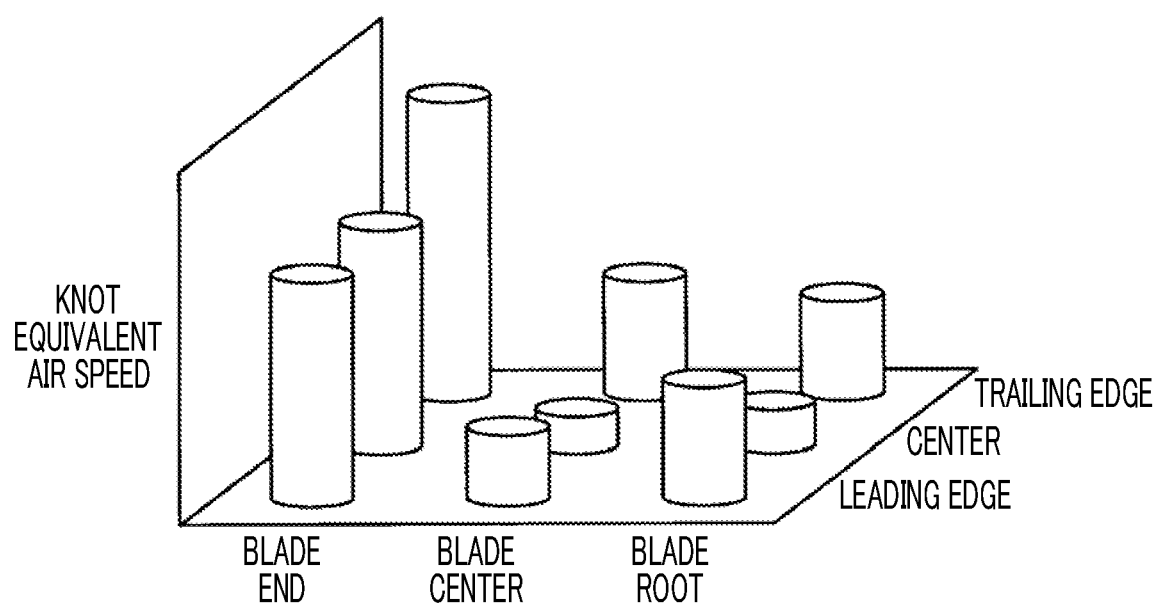
FIG. 11 is a view for describing an example of a flutter speed calculated for each pattern.

The flutter speed calculation step ST3 is a step of calculating the flutter speed at which the flutter occurs in the wing 10, for each pattern set in the pattern setting step ST2 by using a numerical analysis. More specifically, for example, the flutter speed of the wing 10 is calculated for each pattern by using an analysis method based on numerical simulation such as a finite element method. FIG. 11 is a view for describing an example of the flutter speed calculated for each pattern. FIG. 11 illustrates a value of the flutter speed of the wing 10, when any one of the respective regions 20 (refer to FIG. 3) divided into the nine regions is formed of the composite material of the high elasticity type in the wing length direction from the wing root 10a side to the wing end 10b side and in the wing chord direction from the leading edge 10c side to the trailing edge 10d side.

The optimal pattern determination step ST4 is a step of determining an optimal pattern which maximizes the flutter speed calculated in the flutter speed calculation step ST3. As illustrated in FIG. 11, as an example, in the flutter speed calculation step ST3, in a case where the region closest to the wing end 10b side and the trailing edge 10d side is formed of the composite material of the high elasticity type, an analysis result is obtained in which the pattern maximizes the flutter speed. Therefore, in the optimal pattern determination step ST4, as the optimal pattern, a pattern is determined in which the region 20 closest to the wing end 10b side and the trailing edge 10d side is set as the second region 202, and in which the remaining regions 20 are set as the first region 201.

As described above, in the design method of the wing according to the embodiment, it is possible to calculate the pattern that maximizes the flutter speed at which the flutter occurs in the wing, with regard to each pattern of the first region 201 formed of the composite material of the high strength type and the second region 202 formed of the composite material of the high elasticity type. Therefore, while the flutter characteristics of the wing are improved, the composite material of the high elasticity type can be prevented from being used in an unnecessary range. Therefore, according to the design method of the wing in the embodiment, it is possible to compatibly achieve the improved flutter characteristics and the reduced manufacturing cost of the wing in which the configuration member is partially formed of the composite material.

In the present embodiment, the plurality of regions 20 are divided into the nine regions. However, the plurality of regions 20 may be divided into at least two regions in the wing length direction and at least two regions in the wing chord direction. In addition, without being limited to the grid shape, the plurality of regions 20 may be divided in any shape and arrangement. In addition, each region of the plurality of regions 20 may have a different area.

In addition, in the design method of the wing according to the present embodiment, in the pattern setting step ST2, a pattern is prepared in which any one of the plurality of regions 20 is set as the second region 202, and in which all of the remaining regions are as the first region 201. However, in the pattern setting step ST2, a pattern may be prepared in which any two or more regions out of the plurality of regions 20 are set as the second region 202, and in which all of the remaining regions are set as the first region 201. As a result, it is possible to obtain the optimal pattern in a case where two or more of the second regions 202 are provided. The wing 10 according to the embodiment may be formed to include two or more of the second regions 202 in accordance with the optimal pattern.

In the present embodiment, a portion of the configuration member of the wing 10 divided into the first region 201 and the second region 202 is the upper skin 11. However, the configuration member divided into the first region 201 and the second region 202 may include any one of the stringer 12, the rib 13, the girder 14, and the lower skin (not illustrated). For example, in a case where the girder 14 is divided into the first region 201 and the second region 202, the girder 14 located on the leading edge 10c side and the girder 14 located on the trailing edge 10d side may be set as the regions 20 divided in the wing chord directions. In addition, in a case where the girder 14 is divided into the first region 201 and the second region 202, the plurality of regions 20 may be divided in the wing thickness direction.

REFERENCE SIGNS LIST 10, 100: wing
10a: wing root
10b: wing end
10c: leading edge
10d: trailing edge
11: upper skin
12: stringer
13: rib
14: girder
20: region
201: first region
202: second region
30: node
D: distance
L: lifting force
Ma, Mk: moment force

The invention claimed is:

1. A wing used for an aircraft, comprising:
a configuration member formed of composite materials including a first composite material and a second composite material,
wherein the configuration member is divided into a plurality of regions along an upper surface of the wing,
wherein the plurality of regions include a first region formed of the first composite material, and a second region formed of the second composite material having rigidity higher than a rigidity of the first composite material of the first region, and
wherein the first region includes a region closest to both a wing end side and a leading edge side of the wing, and the second region includes a region closest to both the wing end side and a trailing edge side of the wing.

2. The wing according to claim 1, wherein the plurality of regions are divided in a wing length direction and a wing chord direction orthogonal to the wing length direction.

3. The wing according to claim 2, wherein the plurality of regions are divided in a grid shape in the wing length direction and the wing chord direction.

4. The wing according to claim 1, wherein the plurality of regions are divided to have equal areas.

5. The wing according to claim 1, wherein the configuration member is a skin.

6. A design method of an aircraft wing including a configuration member formed of composite materials including a first composite material and a second composite material, the method comprising:
dividing a surface of the configuration member into a plurality of regions along an upper surface of the aircraft wing;
setting each pattern of a first region and a second region by dividing the plurality of regions into the first region formed of the first composite material and the second region formed of the second composite material having a rigidity higher than a rigidity of the first composite material of the first region, the first region including a region closest to both a wing end side and a leading edge side of the wing, and the second region includes a region closest to both the wing end side and a trailing edge side of the wing;
calculating a flutter speed at which a flutter occurs in the wing, for each pattern by using a numerical analysis; and
determining the pattern that maximizes the calculated flutter speed, as an optimal pattern.

* * * * *